(12) United States Patent
Fan

(10) Patent No.: US 11,479,694 B2
(45) Date of Patent: *Oct. 25, 2022

(54) HIGH-PERFORMANCE ULTRA-THIN DOUBLE-SIDED ADHESIVE TAPE

(71) Applicant: Jiangsu Enoel New Material Technology Co., Ltd, Jiangsu (CN)

(72) Inventor: Shaoyu Fan, Enshi (CN)

(*) Notice: Subject to any disclaimer, the term of this patent is extended or adjusted under 35 U.S.C. 154(b) by 96 days.

This patent is subject to a terminal disclaimer.

(21) Appl. No.: 17/079,124

(22) Filed: Oct. 23, 2020

(65) Prior Publication Data

US 2022/0127501 A1 Apr. 28, 2022

(51) Int. Cl.
*C09J 7/38* (2018.01)
*C09J 7/25* (2018.01)

(52) U.S. Cl.
CPC ............... *C09J 7/385* (2018.01); *C09J 7/255* (2018.01); *C09J 2301/124* (2020.08); *C09J 2433/00* (2013.01); *C09J 2467/006* (2013.01)

(58) Field of Classification Search
CPC ......... C09J 133/08–133/12; C09J 7/385; C09J 2467/006; C09J 2301/124; Y10T 428/1462

See application file for complete search history.

(56) References Cited

U.S. PATENT DOCUMENTS

| 7,655,106 B2* | 2/2010 | Nishiyama | C09J 7/20 156/289 |
| 2020/0148919 A1* | 5/2020 | Ikami | C09J 133/08 |
| 2020/0165497 A1* | 5/2020 | Ikeda | C08F 220/1804 |
| 2021/0292611 A1* | 9/2021 | Higuchi | B32B 5/024 |

FOREIGN PATENT DOCUMENTS

| CN | 104178048 A | 12/2014 | |
| CN | 110964465 A * | 4/2020 | ......... C09J 133/066 |
| WO | WO-2018221336 A1 * | 12/2018 | ......... B32B 27/065 |

OTHER PUBLICATIONS

Machine translation of CN110964465A. Retrieved Mar. 23, 2022.*

* cited by examiner

*Primary Examiner* — Prashant J Khatri
(74) *Attorney, Agent, or Firm* — Rumit Ranjit Kanakia

(57) ABSTRACT

The invention relates to the technical field of adhesive tape and discloses a high-performance ultra-thin double-sided adhesive tape, including a polyester film substrate, a high-performance adhesive coating coated on both sides of the polyester film, wherein the high-performance adhesive coating is composed of the following parts by weight of each component uniformly mixed: 100-140 parts by weight of high-performance acrylic pressure sensitive adhesive, 15-20 parts by weight of curing agent, and 130-160 parts by weight of ethyl acetate. The thickness of the adhesive tape is 0.003-0.010 mm, with a good adhesion and a mechanical strength.

5 Claims, 2 Drawing Sheets

HIGH-PERFORMANCE ULTRA-THIN DOUBLE-SIDED ADHESIVE TAPE

TECHNICAL FIELD

The invention relates to the technical field of adhesive tape, and in particular discloses a high-performance ultra-thin double-sided adhesive tape.

BACKGROUND ART

Double-sided adhesive tape is composed of a carrier (so-called substrate), an adhesive layer with pressure-sensitive adhesive on both sides and a release material and is a commonly used bonding material in the electronic products. With the rapid development of the electronic consumer products, the electronic consumer products, such as smart phone and IPAD, are gradually becoming thinner, which brings a huge challenge to the double-sided adhesive tape, which is an indispensable adhesive material for the electronic products, that is the material is required to be thin and meet high performance requirements.

Examples of challenges in the application of double-sided adhesive tape in the electronic products are as follows: (1) the fixation of the flexible printed circuit: the application of the flexible printed circuit (FPC) can greatly reduce the volume and quality of the electronic products; with the thinning of the electronic products, the volume proportion of FPC in the products is small and small; and double-sided adhesive tape is an important material for fixing FPC, and its thickness requirements are becoming more and more stringent; (2) While the electronic products such as wireless charger have become ultra-thin, the heat dissipation of the products has also become a major problem; the double-sided adhesive tape is a necessary material for bonding between heat dissipation materials, and the thickness of the material directly affects the thermal conductivity of the product; and meanwhile, the adhesive tape is required to have excellent high temperature resistance; (3) Some precision parts with low surface energy in the electronic products need special fixing and protection, and there are extremely high requirements for the bonding strength of the double-sided adhesive tape. It can be seen from the above examples that the market demand for ultra-thin and high-performance double-sided adhesive tape is becoming more and more urgent.

The thickness of traditional double-sided adhesive tape is mostly 0.05-0.250 mm. Double-sided adhesive tape with a thickness of less than 0.05 mm is considered to an ultra-thin double-sided adhesive tape. However, with the continuous development of the market, customers' requirements for the thickness are becoming more and more ultra-thin. The thickness on the current market is difficult to be lower than 0.015 mm, and the peel strength is weak, and the high temperature holding force is poor, which fails to better meet customers' requirements. The invention patent with application number CN201410440357.1 proposes an ultra-thin thermal conductive adhesive tape, which is a single-sided adhesive tape or double-sided adhesive tape with a substrate or no substrate; when the adhesive tape is an adhesive tape without a substrate, the adhesive tape is composed of a thermal conductive adhesive with a thickness of 0.5-2 μm; when the adhesive tape is an adhesive tape with a substrate, the adhesive tape is composed of a substrate with a thickness of 1-5 μm and a thermal conductive adhesive with a total thickness of 0.5-2 μm on one or both sides, wherein the thermal conductive adhesive is made by adding nano ceramic thermal conductive filler, nano metal thermal conductive filler and carbon nano tube or graphene to high molecular polymer. Due to the use of the above thermal conductive adhesives, it can be made as thin as 0.5 μm with a thermal conductivity of more than 20 W/(m·k), and the thermal conductive adhesive tape with this thickness can have greater mechanical strength and better mechanical properties than existing thermal conductive adhesive tapes. This application intends to provide a high-performance ultra-thin double-sided adhesive tape with a different composition and structure from the above patents to meet the higher requirements of customers.

SUMMARY

At present, there are double-sided adhesive tapes on the market that are thicker and have unsatisfactory peel strength, and it is difficult to break through these disadvantages in a short time. The development of the present invention can quickly and effectively solve these existing disadvantages, and truly meet the requirements of customers.

The specific technical scheme adopted by the present invention is as follows: a high-performance ultra-thin double-sided adhesive tape is provided, comprising a polyester film substrate, a high-performance adhesive coating coated on both sides of the polyester film, wherein an overall thickness of the polyester film substrate coated with the high-performance adhesive coating on both sides is 0.003-0.010 mm, the high-performance adhesive coating is composed of the following parts by weight of each component uniformly mixed: 100-140 parts by weight of high-performance acrylic pressure sensitive adhesive, 15-20 parts by weight of curing agent, and 130-160 parts by weight of ethyl acetate.

Further, a thickness of the polyester film substrate is 1.4 μm. Through the improvement of raw materials, the control of drying moisture, the improvement of the extrusion process, the electrostatic adsorption process and the control of the heat shrinkage rate, the thickness of the polyester film can be as low as 1.4 μm. As a result, the thickness of the double-sided adhesive tape can be so low, and the optimization of the above coating formula ensures that the adhesive tape has a good adhesion.

Further, the high-performance acrylic pressure sensitive adhesive comprises 40-60 parts of acrylate copolymer, 20-30 parts of toluene, and 15-25 parts of ethyl acetate. The acrylate copolymer is composed of methyl methacrylate, ethyl methacrylate, ethyl acrylate, butyl acrylate, and 2-ethylhexyl methacrylate.

Further, the curing agent comprises 45% isocyanate and 55% ethyl acetate. Because the substrate is thin, adding an appropriate amount of curing agent to the adhesive can achieve the effect of high peeling force.

Further, the high-performance adhesive coating is coated on the polyester film substrate by micro-gravure coating, a coating amount is 15-30 g/m$^2$, and a coating speed is 20±2 m/min.

Further, the high-performance adhesive coating is coated on both sides of the polyester film substrate, and a release layer is attached to the high-performance adhesive coating. The release layer is preferably a PET release film.

Further, the resulting high-performance ultra-thin double-sided adhesive tape has a wide range of applications in wireless charging.

The beneficial effects of the present invention are: the thickness of the high-performance ultra-thin double-sided adhesive tape obtained by the present invention can be as low as 0.003-0.010 mm, and the peeling performance, high temperature resistance performance, and soft adhesion are improved; and it has a wide range of applications in wireless charging, which can improve our company's core competitiveness in the field of adhesive tape, which is of great significance. The continuous improvement of the quality of self-made high-performance ultra-thin double-sided adhesive tape can drive the common development of enterprises in this industry.

DETAILED DESCRIPTION OF THE EMBODIMENTS

Figure 1:
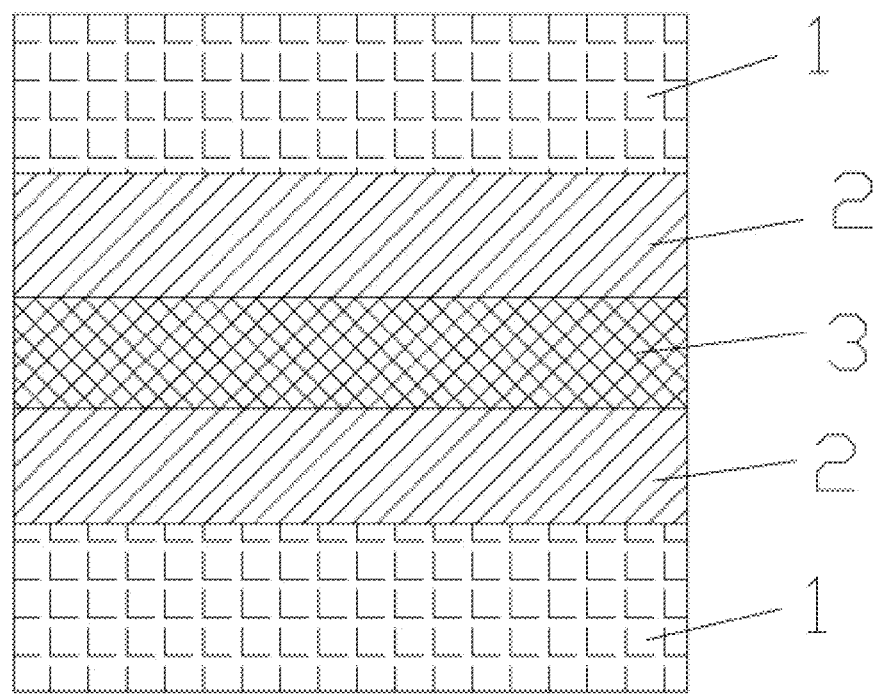
FIG. 1 is a schematic cross-sectional structure diagram of a high-performance ultra-thin double-sided adhesive tape of the present invention.
Figure 2:
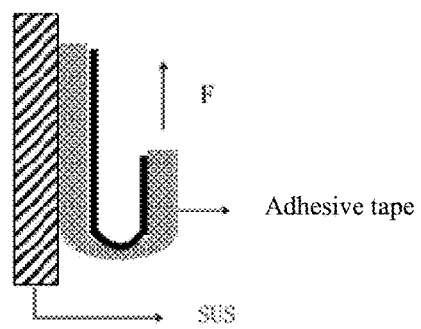
FIG. 2 is a schematic diagram of the adhesion test.
Figure 3:
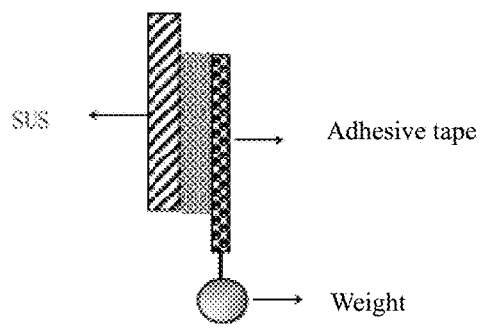
FIG. 3 is a schematic diagram of the retention test.
Figure 4:
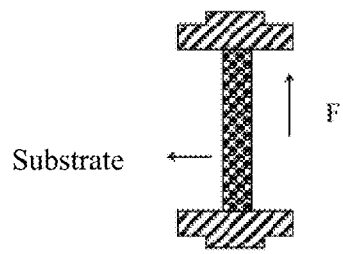
FIG. 4 is a schematic diagram of the tensile strength test of the substrate.
In the figures, 1—release layer; 2—high-performance adhesive coating; 3—polyester film substrate.

As shown in FIG. 1, the present application provides a high-performance ultra-thin double-sided adhesive tape, comprising a polyester film substrate, a high-performance adhesive coating coated on both sides of the polyester film, wherein the high-performance adhesive coating is composed of the following parts by weight of each component uniformly mixed: 100-140 parts by weight of high-performance acrylic pressure sensitive adhesive, 15-20 parts by weight of curing agent, and 130-160 parts by weight of ethyl acetate.

Through the improvement of raw materials, the control of drying moisture, the improvement of the extrusion process, the electrostatic adsorption process and the control of the heat shrinkage rate, the thickness of the polyester film can be as low as 1.4 μm.

The high-performance acrylic pressure sensitive adhesive comprises 40-60 parts of acrylate copolymer, 20-30 parts of toluene, and 15-25 parts of ethyl acetate. The acrylate copolymer is composed of methyl methacrylate, ethyl methacrylate, ethyl acrylate, butyl acrylate, and 2-ethylhexyl methacrylate.

The curing agent comprises 45% isocyanate and 55% ethyl acetate. Because the substrate is thin, adding an appropriate amount of curing agent to the adhesive can achieve the effect of high peeling force.

Further, the high-performance adhesive coating is coated on both sides of the polyester film substrate, and a release layer is attached to the high-performance adhesive coating.

The resulting high-performance ultra-thin double-sided adhesive tape has a wide range of applications in wireless charging.

The high-performance adhesive coating is coated on the polyester film substrate by micro-gravure coating, a coating amount is 15-30 g/m$^2$, and a coating speed is 20±2 m/min. The thickness of the resulting double-sided adhesive tape is 0.003-0.005 mm.

The specific production process of a high-performance double-sided adhesive tape is as follows:
A1. preparation of high-performance adhesive coating: weighing 100-140 parts of high-performance acrylic pressure sensitive adhesive, 15-20 parts of curing agent, and 130-160 parts of ethyl acetate, stirring and mixing them evenly, and setting it aside;

A2. cleaning the polyester film material, removing the oil and impurities on the surface, and setting it aside;
A3. fully filtering the adhesive coating prepared in step A1 with a 600 mesh filter cloth, and sealing for use after the filtration;
A4. transferring the adhesive coating prepared by A3 to coat one side of the polyester film material prepared by A2 by using micro-gravure coating;
A5. drying, and storing the semi-finished polyester film double-sided adhesive tape into a roll;
A6. transferring the adhesive coating prepared by A3 to coat the other side of the substrate of the semi-finished polyester film double-sided adhesive tape prepared by A4 by using micro-gravure coating;
A7. drying, attaching the release layer on the adhesive coating, and storing the high-performance ultra-thin double-sided adhesive tape into a roll.

Embodiment 1

The preparation of high-performance adhesive coating: firstly, weighing 40-60 parts of acrylate copolymer, 20-30 parts of toluene, and 15-25 parts of ethyl acetate to prepare the high-performance acrylic pressure sensitive adhesive, and then weighting 100 parts of the high-performance acrylic pressure sensitive adhesive, 15 parts of curing agent, and 130 parts of ethyl acetate to stir and mix evenly to obtain the adhesive coating, wherein the curing agent comprises 45% isocyanate and 55% ethyl acetate, and setting it aside; then cleaning the polyester film material, removing the oil and impurities on the surface, and setting it aside; then fully filtering the resulting adhesive coating with a 600 mesh filter cloth, and sealing for use after the filtration; then transferring the resulting adhesive coating to one side of the polyester film material by using micro-gravure coating, with a coating amount of 15 g/m$^2$ and a coating speed of 18 m/min, and then drying, and storing the semi-finished polyester film double-sided adhesive tape into a roll; transferring the resulting adhesive coating to the other side of the substrate of the semi-finished polyester film double-sided adhesive tape by using micro-gravure coating, with a coating amount of 15 g/m$^2$ and a coating speed of 18 m/min; and then drying, attaching the release layer on the adhesive coating, and storing the high-performance ultra-thin double-sided adhesive tape into a roll, wherein the release layer is a PET release film. The resulting high-performance ultra-thin double-sided adhesive tape has a thickness of 0.003-0.004 mm.

Embodiment 2

The difference between this embodiment and Embodiment 1 is that the formula for preparing the high-performance ultra-thin double-sided adhesive tape is 140 parts of high-performance acrylic pressure sensitive adhesive, 20 parts of curing agent, and 160 parts of ethyl acetate. The coating process parameters are coating amount of 30 g/m$^2$ and the coating speed of 22 m/min. The resulting high-performance ultra-thin double-sided adhesive tape has a thickness of 0.004-0.005 mm.

Embodiment 3

The difference between this embodiment and Embodiment 1 is that the formula for preparing the high-performance ultra-thin double-sided adhesive tape is 120 parts of high-performance acrylic pressure sensitive adhesive, 18 parts of curing agent, and 150 parts of ethyl acetate. The coating process parameters are coating amount of 25 g/m² and the coating speed of 20 m/min. The resulting high-performance ultra-thin double-sided adhesive tape has a thickness of 0.004 mm.

Performance test:
Adhesion test (20 min 180° peeling strength):
Test standard: ASTM D3330
Cutting width: 25 mm
Bonding condition: rolling mill (2KG roller)
Backing material: 25 μPET
Test environment: T=22±5° C., RH=55±10%
Peeling speed: 300 mm/min
Retention test:
Test standard: ASTM D3654
Cutting specification: 90 mm*25 mm
Bonding condition: 2KG pressing roller
Backing material: 25 μPET Testing at room temperature, the adhesive tape and SUS are attached and left for 20 minutes, and then placed in the retention tester, and then the weight is hung to start the test; testing the temperature resistance, the adhesive tape and SUS are attached and left for 20 minutes, and then placed in the retention tester and left for 20 minutes, and then the weight is hung to start the test.

Substrate tensile strength test:
Test standard: ASTM D3759
Cutting specification: 25 mm*150 mm (the length of the sample between the upper
and lower clamps is 100 mm)
Test environment: T=22±5° C., RH=55±10%
Tensile strength: 300 mm/min The above-prepared double-sided adhesive tape was subjected to related performance tests, and the results are shown in Table 1.

TABLE 1

Performance test results of the adhesive tapes obtained in Embodiments 1 to 3

| Item | Embodiment 1 | Embodiment 2 | Embodiment 3 | Test condition |
| --- | --- | --- | --- | --- |
| 180° peeling strength test (A/B sides) | 642 g/25 mm | 712 g/25 mm | 682 g/25 mm | W = 25 mm, V = 300 mm/min Turn 25 μPET test |
| A/B sides room temperature retention | 0.8 mm | 1.0 mm | 1.0 mm | 0.5 KG/24 H T = 22 ± 5° C., RH = 55 ± 10% |
| Longitudinal tensile strength Mpa | 50 | 50 | 50 | T = 24° C., RH = 60% |
| Transverse tensile strength Mpa | 40 | 40 | 40 | |
| Longitudinal percentage of breaking elongation % | 85 | 85 | 85 | |
| Transverse percentage of breaking elongation % | 80 | 80 | 80 | |

It can be seen from Table 1 that the thickness of the ultra-thin double-sided adhesive tape obtained in this application is 0.003-0.010 mm, and still obtains a good adhesion, the adhesion between the substrate and the adhesive is large, and the mechanical property of the adhesive tape is excellent. In summary, the benefits of this product are: it can improve the thickness, enhance the peeling performance, high temperature resistance, and improve the soft adhesion. The implementation of this application can improve the core competitiveness of our company in the adhesive tape field, which is important significance. The continuous improvement of the quality of self-made high-performance ultra-thin double-sided adhesive tape can drive the common development of enterprises in this industry.

The invention claimed is:

1. A high-performance ultra-thin double-sided adhesive tape, comprising a polyester film substrate, a high-performance adhesive coating coated on both sides of the polyester film, wherein an overall thickness of the polyester film substrate coated with the high-performance adhesive coating on both sides is 0.003-0.010 mm, the high-performance adhesive coating is composed of the following parts by weight of each component uniformly mixed: 100-140 parts by weight of high-performance acrylic pressure sensitive adhesive, 15-20 parts by weight of curing agent, and 130-160 parts by weight of ethyl acetate;

wherein the high-performance acrylic pressure sensitive adhesive comprises 40-60 parts of acrylate copolymer, 20-30 parts of toluene, and 15-25 parts of ethyl acetate, the acrylate copolymer is composed of methyl methacrylate, ethyl methacrylate, ethyl acrylate, butyl acrylate, and 2-ethylhexyl methacrylate.

2. The high-performance ultra-thin double-sided adhesive tape according to claim 1, wherein a thickness of the polyester film substrate is 1.4 μm.

3. The high-performance ultra-thin double-sided adhesive tape according to claim 1, wherein the curing agent comprises 45% by weight of isocyanate and 55% by weight of ethyl acetate.

4. The high-performance ultra-thin double-sided adhesive tape according to claim 1, wherein the high-performance adhesive coating is coated on the polyester film substrate by micro-gravure coating, a coating amount is 15-30 g/m2, and a coating speed is 20±2 m/min.

5. The high-performance ultra-thin double-sided adhesive tape according to claim 1, wherein the high-performance adhesive coating is coated on both sides of the polyester film substrate, and a release layer is attached to the high-performance adhesive coating.

\* \* \* \* \*